R. W. MORRISON.
CASEMENT ADJUSTER.
APPLICATION FILED MAY 29, 1918.
1,330,333.
Patented Feb. 10, 1920.
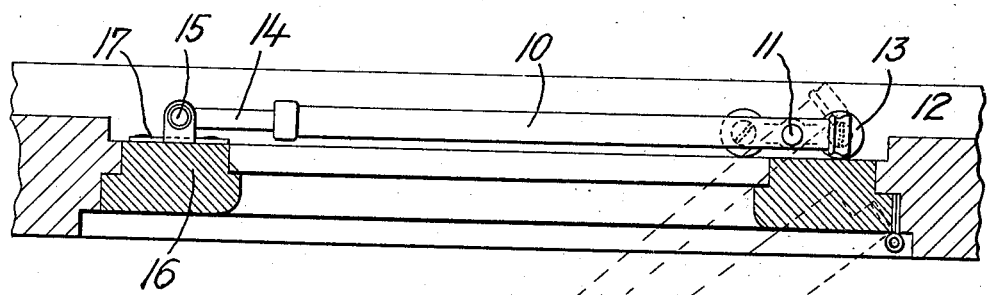
Fig. 1
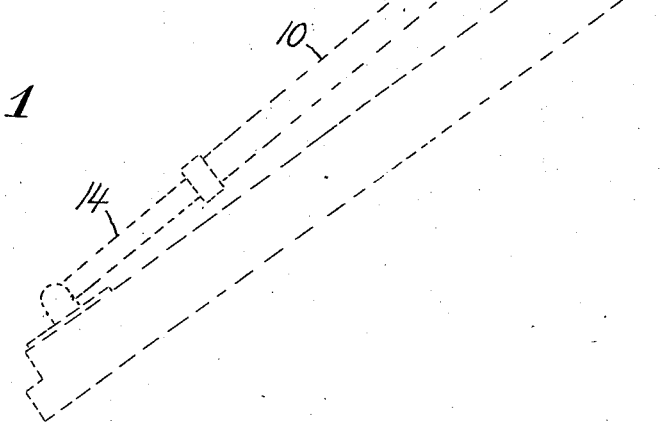
Fig. 2
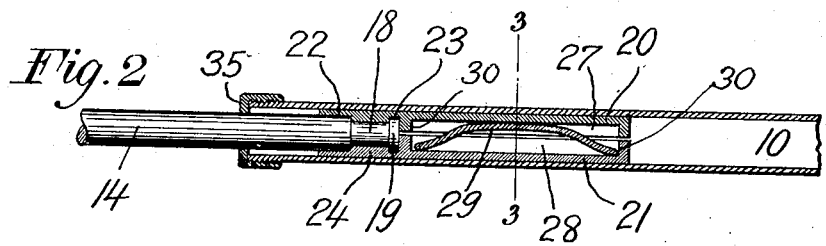
Fig. 3
Fig. 4
Fig. 5
Robert W. Morrison Inventor
By his Attorney
Ivan E. A. Konigsberg.

UNITED STATES PATENT OFFICE.

ROBERT W. MORRISON, OF JAMAICA, NEW YORK, ASSIGNOR TO UNITED SPECIALTIES MANUFACTURING CO., LTD., A CORPORATION OF CANADA.

CASEMENT-ADJUSTER.

1,330,333.  Specification of Letters Patent.  Patented Feb. 10, 1920.

Application filed May 29, 1918. Serial No. 237,212.

*To all whom it may concern:*

Be it known that I, ROBERT W. MORRISON, a citizen of the Dominion of Canada, and resident of Jamaica, in the county of Queens and State of New York, have invented certain new and useful Improvements in Casement-Adjusters, of which the following is a specification.

This invention relates to improvements in casement adjusters for casement or vertically hinged windows. More particularly the invention relates to an improved friction clutch for use on casement adjusters.

The object of the invention is to provide a friction clutch of simple practical construction comprising but few parts and adapted to be assembled and placed in position in an easy manner. Other objects will appear as this specification proceeds.

Accordingly my invention is embodied in a friction clutch for casement adjusters constructed as hereinafter set forth and as illustrated in the accompanying drawing in which—

Figure 1 is a plan view showing the device in position, parts being in section;

Fig. 2 is a longitudinal sectional view of the clutch;

Fig. 3 is a cross sectional view on line 3—3 of Fig. 2;

Fig. 4 shows the two clutch members; and

Fig. 5 is a view of the clutch spring.

The casement adjuster consists of two principal parts, a tube 10 pivoted at 11 to the window sill or frame 12 by means of a suitable bracket 13, and a plunger 14 pivoted at 15 to the sash 16 by means of a suitable bracket 17.

The end of the plunger 14 is within the tube provided with a reduced portion 18 forming a head 19. The clutch consists of two symmetrical clutch shoes 20 and 21 provided with sockets 22 and 23, adapted to receive the plunger and its head 19, the enlarged portion 24 forming shoulders 25 and 26. The clutch shoes are substantially semi-circular in cross section and are provided with recesses 27 and 28 for the reception of the spring 29.

In assembling the clutch the plunger and the spring are laid between the clutch shoes as shown. Thereafter the shoes are forced toward each other (by a vise for instance, not shown) and pushed into the tube where the parts assume the position shown in Fig. 2.

The device is applied to the window as shown in Fig. 1. When the window is opened, the plunger is drawn out of the tube, the withdrawing action being resisted by the frictional engagement between the clutch or the shoes thereof and the tube, so that the window will remain in whatever position it is placed.

The construction as here outlined posseses many advantages. In the first place, the several parts of the clutch are not secured together, but merely held in position whereby a saving in time and material is effected. The head 19 and reduced portion 18 on the plunger together with the recesses 22 and 23 on the clutch shoes prevent the latter from becoming separated from the plunger. The recesses 27 and 28 receive the single strong steel spring and keep it in position without any special fastening means. The length of these recesses is slightly longer than the length of the spring so as to allow for the stretching thereof when in position and at the same time, the ends 30 of said recesses serve as means for limiting the stretching or flattening action of the spring. In other words, the spring is held within the clutch shoes in such a manner that sufficient space lengthwise is provided to permit the spring to adjust itself, while on the other hand, the ends of the recesses prevent the spring from flatening or collapsing to an extent which would render it inefficient or useless. It is, of course, immaterial whether the spring is laid with the shoe 20 or the shoe 21.

Inasmuch as the clutch shoes serve two purposes, namely, that of acting as clutching members and also that of serving as a sliding bearing between the tube and the rod, I propose to make them of Babbitt metal which has a low coefficient of expansion.

It will be noted that the friction joint between the tube and the rod consists of only three parts—the two shoes and the spring—and that the shoes are so shaped that they cannot become detached from the plunger head, and that the spring cannot turn within the shoe: also, that the shoes have means for preventing the collapse of the spring. A cap 35 closes the end of the tube, serves as a guiding means for the plunger rod and enchances the appearance of the device.

The device may be used on inside or outside sashes or on doors and blinds, and changes in the detailed construction disclosed may of course be made without departing from the spirit of the invention as defined by the appended claim.

I claim—

The combination of a tube, a plunger adapted to slide therein and having a reduced portion near its end forming a head within the said tube, clutching means interposed between the said tube and plunger and comprising a pair of symmetrical oppositely disposed clutch shoes, each of said clutch shoes being formed with a plurality of recesses for receiving the end portion of the said plunger, the said reduced portion thereof and the said head, whereby to detachably and operatively connect said plunger and shoes, a spring held loosely between the said clutch members and adapted to force the same into frictional contact with the said tube, said clutch shoes having oppositely disposed recesses for receiving the said spring, the ends of said last named recesses forming means for limiting the longitudinal movement of said spring within the said clutch shoe recesses.

Signed at New York, in the county of New York and State of New York, this 15th day of May, A. D. 1918.

ROBERT W. MORRISON.